(12) United States Patent
Palazzolo et al.

(10) Patent No.: US 8,734,897 B2
(45) Date of Patent: May 27, 2014

(54) METHOD FOR PRODUCING A MULTILAYER CONCRETE-BASED COATING ON A CERAMIC OR EARTHENWARE SURFACE

(76) Inventors: Rocco Palazzolo, Paris (FR); Moktar Mejladi, Cepoy (FR)

( * ) Notice: Subject to any disclaimer, the term of this patent is extended or adjusted under 35 U.S.C. 154(b) by 0 days.

(21) Appl. No.: 13/289,895

(22) Filed: Nov. 4, 2011

(65) Prior Publication Data
US 2012/0164332 A1 Jun. 28, 2012

(30) Foreign Application Priority Data
Nov. 5, 2010 (FR) ...................................... 10 59151

(51) Int. Cl.
*B05D 5/10* (2006.01)

(52) U.S. Cl.
USPC .................. 427/207.1; 427/208.2; 427/208.4

(58) Field of Classification Search
USPC ................. 427/207.1, 208.2, 208.4
See application file for complete search history.

(56) References Cited

U.S. PATENT DOCUMENTS

| | | | |
|---|---|---|---|
| 4,221,597 A * | 9/1980 | Mallow | 106/624 |
| 5,447,561 A * | 9/1995 | Chiba et al. | 524/121 |
| 6,167,668 B1 | 1/2001 | Fine et al. | |
| 6,189,287 B1 | 2/2001 | Guerinet et al. | |
| 7,851,546 B2 | 12/2010 | Palazzolo et al. | |
| 2002/0059776 A1 | 5/2002 | Harvey | |
| 2004/0002393 A1 * | 1/2004 | Tessier | 472/89 |
| 2004/0035329 A1 * | 2/2004 | Sullivan | 106/709 |
| 2005/0027024 A1 * | 2/2005 | Zhang et al. | 521/50 |
| 2008/0257222 A1 * | 10/2008 | Wallner | 106/689 |
| 2008/0286519 A1 * | 11/2008 | Nicolson et al. | 428/67 |
| 2009/0123763 A1 | 5/2009 | Palazzolo et al. | |

FOREIGN PATENT DOCUMENTS

| | | |
|---|---|---|
| DE | 4429785 C1 | 1/1996 |
| FR | 2751997 A1 | 2/1998 |
| JP | 2008-230952 A1 | 10/2008 |

OTHER PUBLICATIONS

Fresco and patina application for lime plasters, The Earth Pigments Company, http://www.earthpigments.com/plaster-cement/fresco-and-patina-application-for-lime-plasters.cfm, Sep. 5, 2010.*

* cited by examiner

*Primary Examiner* — Michael Cleveland
*Assistant Examiner* — Xiao Zhao
(74) *Attorney, Agent, or Firm* — Baker & Hostetler LLP

(57) ABSTRACT

A method for producing a decorative coating on a surface made of a mineral compound that is ceramic or earthenware, the method including: depositing an adhesive primer layer on said surface made of a mineral compound; depositing a concrete layer; hardening said concrete layer; and depositing a decorative layer. Advantageously, the concrete may be a self-leveling concrete.

18 Claims, No Drawings

METHOD FOR PRODUCING A MULTILAYER CONCRETE-BASED COATING ON A CERAMIC OR EARTHENWARE SURFACE

CROSS-REFERENCE TO RELATED APPLICATIONS

This application claims priority to foreign French patent application No. FR 10 59151, filed on Nov. 5, 2010, the disclosure of which is incorporated by reference in its entirety.

FIELD OF THE DISCLOSED SUBJECT MATTER

The field of the invention is that of surface coatings, notably for surfaces exposed to any type of stress, for example a load (for a floor) or even substantial heating (for a kitchen worktop) or even chemical attack by acidic cleaning products.

BACKGROUND

Currently there are many classes of highly resistant surface coatings but the logistics of these coatings are generally quite complicated and when it is desired to change them, for reasons of wear-and-tear or a change in decor, the latter operation is also costly.

Thus, at the present time, when a user desires to change a decorative coating on a floor or kitchen or bathroom wall, for example a tiled floor or wall, usually they remove the tiling and undertake rather skilled work to fit a new set of tiles. The same is true when a user desires to change a kitchen worktop matched with the surrounding tiling.

While the public's obsession for redecorating is continuing to grow it is increasingly desired to find solutions that make this type of job easier for users, and more particularly for DIY users, while improving the appearance of these renovating coatings.

It has already been proposed to use purely synthetic coatings based on decorative paint, comprising organic protective resins; nevertheless, such decorative coatings have a number of drawbacks that the solution of the present invention proposes to alleviate. Specifically, a coat of paint covered with a simple synthetic resin layer, even if this layer is thick, is unsatisfactory when used to cover substantially inhomogeneous surfaces (for instance to cover a missing tile). Moreover, during surface renovation of flooring combined with under-floor heating, purely synthetic coatings do not necessarily provide optimal conduction of heat.

SUMMARY

This is why, in this context, the subject matter of the present invention relates to a method for producing a decorative coating on a surface made of a mineral compound that is possibly ceramic or earthenware, characterized in that it comprises at least the following steps:
- depositing an adhesive primer layer on said surface made of a mineral compound;
- depositing a concrete layer;
- hardening said concrete layer; and
- depositing a decorative layer.

According to one embodiment, the concrete may be a concrete.

According to one embodiment of the invention, the method furthermore comprises a step of producing patterns in the concrete layer.

According to one embodiment of the invention, the method comprises applying a mould allowing said patterns to be produced, before the step of hardening said concrete layer.

According to one embodiment of the invention, the method furthermore comprises applying a demoulding agent to the concrete layer before hardening, said agent possibly being sand-based.

According to one embodiment of the invention, said patterns are produced by successive, local applications of a mould moved step-by-step over the entire area to be treated.

According to one embodiment of the invention, the method furthermore comprises deposition of an upper layer of protective resin.

According to one embodiment of the invention, the adhesive primer layer is deposited using a paint roller.

According to one embodiment of the invention, the concrete layer is deposited using a lacquer roller that allows the thickness of the concrete layer to be controlled.

According to one embodiment of the invention, the layer comprising slaked lime and component aggregates such as marble or granite is deposited using a roller.

According to one embodiment of the invention, the concrete comprises a mineral compound such as granite, and at least one dehydrated synthetic mineral resin.

According to one embodiment of the invention, the decorative layer comprises a layer comprising slaked lime and component mineral aggregates that are possibly made of marble or granite.

According to one embodiment of the invention, the layer comprising slaked lime and marble furthermore comprises powdered natural oxides or earths to give it color.

According to one embodiment of the invention, the decorative layer comprises a two-component paint comprising at least a first pre-polymer component based on bisphenol and epichlorohydrin and at least a second polyamine component.

According to one embodiment of the invention, the decorative layer is a layer of what is called patina paint comprising a resin and slaked lime allowing aged color effects to be obtained.

According to one embodiment of the invention, the method furthermore comprises deposition of an intermediate layer, called an impregnating layer, on the surface of the layer comprising slaked lime and marble so as to set the mineral material, said impregnating layer being resin- and silicate-based.

According to one embodiment of the invention, the protective resin is a microporous resin that is possibly made of polyurethane.

According to one embodiment of the invention, the protective resin is a two-component resin comprising at least a first pre-polymer component based on bisphenol and epichlorohydrin and at least a second polyamine component.

According to one embodiment of the invention, the adhesive primer layer is an acrylic resin.

DETAILED DESCRIPTION

The invention will be better understood by virtue of the following non-limiting description.

Generally, the coating of the present invention may be designed and intended to cover surfaces of any type that it is desired to decorate or for which it is desired to change the decoration, whether it is an internal or external tiled floor or not. The coating of the invention may also be used to coat kitchen wall or worktop surfaces or even tiled surfaces in bathrooms or toilets, or even to coat furniture or appliances such as white goods.

Whatever the surface concerned, it is appropriate in a first step to deposit a first adhesive primer layer intended to support the concrete layer. In the case of a surface that is highly degraded locally and contains deep cracks, it is possible in a prior step to open the cracks and fill them with a filler material.

This adhesive primer layer may typically be an acrylic resin that may be applied using a roller or a spray gun.

Next the concrete layer is deposited. Generally, the term "concrete" is understood to mean a mixture of cement, sand and water. The cement acts as a binder in the hydraulic concrete. Cement consists of a powdered mixture of lime and argillaceous limestone, which hardens with water to form concrete. Moreover, gravel or gravel-like elements are added to the cement to give it strength.

Advantageously, the concrete used in the present invention may comprise a mineral-compound mixture based on granite powder and at least one dehydrated synthetic mineral resin.

Advantageously, the resin may be a dehydrated silicate mineral resin.

The granite powder may make up a small percentage of the mixture, typically about ten percent.

The concrete is mixed with water before deposition. The water provides bulk, via the dehydrated mineral resin, to the whole of the composition. The deposition is advantageously carried out using a lacquer roller ensuring a uniform surface and a controlled thickness. A lacquer roller, such as the roller that was the subject of the patent FR 2 923 402 filed by the applicants, may in particular be very suitable because of its thread, which may possibly be a screw thread, the dimensions of which allow the thickness to be controlled.

When it is desired to provide a surface composed of tiles, paving stones, or which is otherwise patterned, with a rendering that is patterned as before, while avoiding the tedious removal of said multi-element surface, it is possible to produce patterns by applying a mould to the surface of said concrete when the concrete is still wet and therefore unhardened. It is notably possible to follow the procedure described below:

- a screed of said concrete is poured onto the adhesive primer layer, and then while the concrete is still wet;
- advantageously the wet concrete is covered with a pulverulent demoulding agent that is notably possibly sand-based;
- impressions from at least two identical moulds are applied step-by-step in succession over the surface of said concrete by applying pressure to the external face of the mould; and
- the moulds are demoulded vertically by moving them step-by-step along the concrete surface, until it has been completely treated.

Thus a unitary surface is obtained having patterns produced on the upper surface of the concrete.

After a hardening time, the decorative layer of the coating is deposited.

In the following embodiment, this layer may advantageously be made from a mixture of slaked lime, marble and dehydrated mineral resin. To give it color, the above elements are dry mixed with oxides or earths. Typically this composition may comprise about 5% marble powder and about 20% dehydrated resin.

This coating corresponds to a completely mineral, powdered decorative top-coat mortar, the color being provided by the powdered natural earths or oxides. The mineral mortar is naturally very resistant and a chemical resin does not need to be used.

It has exceptional qualities in terms of rendering and allows the appearance of natural stone, notably identical in aspect to marble, to be recreated over the entire support and notably for floors, walls, worktops and basins, showers, patios, etc.

It may be applied with a small thickness, possibly with a thickness typically lying between 3 mm to 6 mm, using a lacquer roller. Its use enables renovation without difficult procedures. For decoration purely of a wall, it may be applied more thinly.

If required, it is possible for this layer to consist of two coats, the second coat being deposited after a drying time which may typically be about 24 hours.

According to another embodiment of the invention, and in order to recreate the appearance of aged colors, the decorative layer may be a coat of paint comprising slaked lime and resin.

The decorative layer may also be based on paint known from the prior art. It may be a two-component paint. This two-component paint may notably furthermore comprise mineral fillers such as titanium dioxide and/or mica and/or barium sulphate and/or talc and/or alkali metal silicates, which reinforce said paint, making it resistant to attack by acids present in conventional cleaning products.

Advantageously, the two-component paint is a water-based paint that can be used to produce decorative effects similar to those of water-based acrylic paints.

Before continuing with the deposition of the protective resin an intermediate layer called an impregnating layer, notably a layer based on resin and silicate, may be applied so as to set the mineral material of the lower layers.

Lastly and advantageously a protective resin is deposited, notably in the case of flooring and of surfaces exposed to moisture (for example in bathrooms, shower cubicles, bathtubs, etc.).

The resin may be a microporous resin based on polyurethane with a satin, gloss or matt appearance, the benefit of the microporosity being that it enables evaporation of incorporated water, so as to set the dehydrated resin-based compositions.

Nevertheless, it is also possible to use two-component resins, particularly impact-resistant resins.

This type of protective resin has particular strength properties. This type of resin is advantageously translucent or even transparent and allows the decoration produced beforehand to be seen. It may advantageously itself comprise inclusions that reinforce the decorative effect. These inclusions may be of any type: decorative micro-objects for bathroom- or toilet-based elements, inclusions that may be made to emit light for flooring via addition of luminescent or phosphorescent particles, etc. In this case, the protective resin is advantageously thicker, having a thickness of about 1000 microns.

The invention claimed is:

1. A method for producing a decorative coating on a surface made of a mineral compound that is ceramic or earthenware, the method comprising:
   depositing an adhesive primer layer on said surface made of a mineral compound;
   depositing a concrete layer;
   hardening said concrete layer;
   depositing a decorative layer, the decorative layer including a mineral material having slaked lime and marble; and
   depositing an intermediate impregnating layer on the surface of the decorative layer to set the mineral material, said impregnating layer being resin- and silicate-based.

2. The method for producing a decorative coating according to claim 1, further comprising producing patterns in the concrete layer.

3. The method for producing a decorative coating according to claim 2, further comprising applying a mould allowing said patterns to be produced, before the hardening of said concrete layer.

4. The method for producing a decorative coating according to claim 3, further comprising applying a demoulding agent to the concrete layer before hardening, said agent being sand-based.

5. The method for producing a decorative coating according to claim 3, wherein said patterns are produced by successive, local applications of a mould moved step-by-step over the entire area to be treated.

6. The method for producing a decorative coating according to claim 1, wherein the concrete is a self-leveling concrete.

7. The method for producing a decorative coating according to claim 1, further comprising deposition of an upper layer of protective resin.

8. The method for producing a decorative coating according to claim 7, wherein the protective resin is a microporous resin comprising polyurethane.

9. The method for producing a decorative coating according to claim 7, wherein the protective resin is a two-component resin comprising a first pre-polymer component based on bisphenol and epichlorohydrin and a second polyamine component.

10. The method for producing a decorative coating according to claim 1, wherein the adhesive primer layer is deposited using a paint roller.

11. The method for producing a decorative coating according to claim 1, wherein the concrete layer is deposited using a coating roller that allows the thickness of the concrete layer to be controlled.

12. The method for producing a decorative coating according to claim 1, wherein the decorative layer comprises slaked lime and component aggregates including marble or granite is deposited using a roller.

13. The method for producing a decorative coating according to claim 1, wherein the concrete comprises a mineral compound including granite, and at least one dehydrated synthetic mineral resin.

14. The method for producing a decorative coating according to claim 1, wherein the decorative layer comprises a layer comprising slaked lime and component mineral aggregates including marble or granite.

15. The method for producing a decorative coating according to claim 1, wherein the decorative layer comprises slaked lime, marble, and powdered natural oxides or earths to give it color.

16. The method for producing a decorative coating according to claim 1, wherein the decorative layer comprises a two-component paint comprising a first pre-polymer component based on bisphenol and epichlorohydrin and a second polyamine component.

17. The method for producing a decorative coating according to claim 1, wherein the decorative layer is a patina paint comprising a resin and slaked lime allowing aged color effects to be obtained.

18. The method for producing a decorative coating according to claim 1, wherein the adhesive primer layer is an acrylic resin.

* * * * *